(12) United States Patent
Aizawa

(10) Patent No.: US 9,892,830 B2
(45) Date of Patent: Feb. 13, 2018

(54) ELECTRONIC COMPONENT AND PRODUCTION METHOD THEREFOR

(71) Applicant: NIPPON CHEMI-CON CORPORATION, Tokyo (JP)

(72) Inventor: Shogo Aizawa, Tokyo (JP)

(73) Assignee: NIPPON CHEMI-CON CORPORATION, Tokyo (JP)

(*) Notice: Subject to any disclaimer, the term of this patent is extended or adjusted under 35 U.S.C. 154(b) by 0 days.

(21) Appl. No.: 15/150,903

(22) Filed: May 10, 2016

(65) Prior Publication Data

US 2016/0254081 A1 Sep. 1, 2016

Related U.S. Application Data

(63) Continuation of application No. PCT/JP2014/005679, filed on Nov. 12, 2014.

(30) Foreign Application Priority Data

Nov. 13, 2013 (JP) .................................. 2013-235138

(51) Int. Cl.

| H01C 17/02 | (2006.01) |
|---|---|
| H01C 1/034 | (2006.01) |
| H01C 7/102 | (2006.01) |
| C09D 7/12 | (2006.01) |
| H01C 7/10 | (2006.01) |
| C08K 3/22 | (2006.01) |

(52) U.S. Cl.
CPC ............ *H01C 17/02* (2013.01); *C09D 7/1216* (2013.01); *H01C 1/034* (2013.01); *H01C 7/10* (2013.01); *H01C 7/102* (2013.01); *C08K 3/22* (2013.01); *C08K 2003/2224* (2013.01); *C08K 2003/2227* (2013.01); *H01C 7/1006* (2013.01)

(58) Field of Classification Search
CPC ...... H01C 17/02; H01C 17/10; H01C 17/102; H01C 17/1006; H01C 1/034; C09D 7/1216; C08K 2003/2224; C08K 2003/2227; C08K 3/22; C08L 83/04; C08L 83/10

See application file for complete search history.

(56) References Cited

U.S. PATENT DOCUMENTS

| 5,936,511 A | 8/1999 | Kawamoto et al. | |
|---|---|---|---|
| 6,447,846 B2 * | 9/2002 | Nakamura | ........... C09D 183/04 257/E21.262 |
| 2001/0029283 A1 | 10/2001 | Nakamura et al. | |
| 2011/0274831 A1 | 11/2011 | Saegusa et al. | |
| 2013/0253108 A1 | 9/2013 | Yao et al. | |

FOREIGN PATENT DOCUMENTS

| CN | 1164107 A | 11/1997 |
|---|---|---|
| CN | 101962519 A | 2/2011 |
| CN | 102318016 A | 1/2012 |
| CN | 103319859 A | 9/2013 |
| DE | 197 02 104 A1 | 7/1997 |
| DE | 11 2010 000 695 T5 | 8/2012 |
| EP | 0 333 514 A1 | 9/1989 |
| EP | 2 641 930 A1 | 9/2013 |
| JP | 6-215910 A | 8/1994 |
| JP | 9-199308 A | 7/1997 |
| JP | 2004-247479 A | 9/2004 |
| JP | 2004-281934 A | 10/2004 |
| JP | 2005-243746 A | 9/2005 |
| JP | 2005-277100 | * 10/2005 |
| JP | 2005-277100 A | 10/2005 |
| JP | 2006-002029 A | 1/2006 |
| JP | 2006-286986 A | 10/2006 |
| JP | 2006-328414 A | 12/2006 |
| JP | 2010-192539 A | 9/2010 |
| JP | 2013-145794 A | 7/2013 |
| JP | 2013-199571 A | 10/2013 |
| KR | 10-0241366 B1 | 2/2000 |
| KR | 10-2011-0105857 A | 9/2011 |
| KR | 10-2013-0108047 A | 10/2013 |
| TW | 201037738 A | 10/2010 |
| WO | 2010/003278 A1 | 1/2010 |
| WO | 2010/092833 A1 | 8/2010 |
| WO | 2013/074637 A1 | 5/2013 |

OTHER PUBLICATIONS

Reger, D.L., et al.; Chemistry: Principles and Practice, 2010, p. 483-484.*
Knovel Critical Tables, 2nd Edition, 2008, p. 1.*
Notification of Transmittal of Translation of the International Preliminary Report on Patentability (Forms PC/IB/338) of International Application No. PCT/JP2014/005679, dated May 26, 2016, with Forms (PCT/IB/373 and PCT/ISA/237. (7 pages).
International Search Report dated Feb. 10, 2015, issued in counterpart International Application No. PCT/JP2014/005679, w/English translation (5 pages).
Written Opinion dated Feb. 10, 2015, issued in counterpart International Application No. PCT/JP2014/005679 (4 pages).
Office Action dated Jul. 21, 2017, issued in counterpart Chinese Application No. 201480060992.5, with partial English translation. (15 pages).
Extended Search Report dated Nov. 2, 2017, issued in couterpart European Application No. 14862954.6 (10 pages).

* cited by examiner

*Primary Examiner* — Robert Jones, Jr.
(74) *Attorney, Agent, or Firm* — Westerman, Hattori, Daniels & Adrian, LLP

(57) ABSTRACT

A production method for an electronic component using an exterior packaging material containing a silicone resin comprises a step of dipping an element into an exterior packaging material containing a silicone resin to which aluminum hydroxide or magnesium hydroxide and a nonpolar solvent are added, an additive amount of the aluminum hydroxide or the magnesium hydroxide being controlled to a range of 60 [wt. %] or more to less than 70 [wt. %], a step of drying the exterior packaging material formed on a surface of the element to evaporate the nonpolar solvent and cause a silicone resin component to appear on a surface of the exterior packaging material, and a curing step of curing the exterior packaging material.

9 Claims, 7 Drawing Sheets

|  | COMPOUNDING RATIO [wt%] | | | | |
|---|---|---|---|---|---|
|  | 50 | 55 | 60 | 65 | 70 |
| AVERAGE PARTICLE DIAMETER [μm] 15 | ○ | ○ | △ | △ | × |
| 30 | ○ | ○ | ○ | ○ | × |
| 50 | ○ | ○ | ○ | △ | × |

ELECTRONIC COMPONENT AND PRODUCTION METHOD THEREFOR

CROSS-REFERENCE TO RELATED APPLICATIONS

This application is a continuation of International Application No. PCT/JP2014/005679, filed on Nov. 12, 2014, which is entitled to the benefit of priority of Japanese Patent Application No. 2013-235138, filed on Nov. 13, 2013, the contents of which are hereby incorporated by reference.

BACKGROUND OF THE INVENTION i) Field of the Invention

A technique of this disclosure relates to an electronic component such as a voltage nonlinear resistor and relates to a technique for imparting flame retardancy or incombustibility to an exterior packaging material covering an element.

ii) Description of the Related Art

Various devices such as electronic devices and electric devices include a combustible material such as plastic used for a housing etc., for the purpose of weight saving and, additionally, since electronic components are mounted at higher density due to requirements for a reduced device size etc., a burnout of an electronic component causes damages of adjacent electronic component and an entire device.

A varistor (voltage nonlinear resistor) is used as an electronic component protecting electronic components and a device from such an inconvenience. The varistor has voltage nonlinear resistance characteristics in which resistance drastically decreases in response to a rise in applied voltage, and is therefore used as a surge absorption element.

In an example of the varistor, on the both surfaces of a sintered body acquired by molding of zinc oxide powder mixed with a trace amount of bismuth oxide powder etc. in a metal mold into a disk shape followed by sintering at 1000[° C.] or higher, disk-shaped electrodes with a diameter smaller than the sintered body are baked and, after lead wires are connected by solder to respective outer surfaces of the electrodes to form an element, this element is coated with an epoxy resin to form an exterior packaging. This exterior packaging fulfills a function of increasing the mechanical strength and heat resistance of the varistor.

The varistor is generally used for protecting electronic components and a device from an external or internal surge and, if the varistor absorbs a surge exceeding a limit of absorption energy, the varistor may be broken and put into a short-circuit state, resulting in the risk of combustion of an exterior packaging material thereof. The exterior packaging material of the varistor is typically made with an inorganic filler component and an epoxy resin component and the combustion of the exterior packaging material is attributable to combustion of the epoxy resin component.

Therefore, a flame-retardant material is used for the exterior packaging material. This flame-retardant material used is, for example, an epoxy resin containing bromine or antimony, which is a flame-retardant agent. However, although being flame-retardant, the epoxy resin may combust if the varistor generates heat in a continuous manner. Once the epoxy resin combusts, the combustion may continue until a combustible component in the exterior packaging material disappears.

It is known that this exterior packaging material is made incombustible by adding a flame-retardant agent that is bromine or antimony. When the flame-retardant agent is increased, the resin itself is reduced in a heated flow rate (fluidity), which makes it difficult to form an exterior packaging film. In the case of powder resin coating, the formation of an exterior packaging film becomes difficult at a resin amount of 30 [wt %] or less. If a combustible component in an exterior packaging material is reduced to a combustion limit amount or less, the exterior packaging material can be made incombustible.

A bromine-based flame-retardant agent, has a function of suppressing combustion of a resin component through gasification. A gasified bromine component imposes a heavy environmental burden such as ozone layer depletion and the usage thereof tends to be limited.

With regard to making a varistor exterior packaging material incombustible, a varistor is known that has a silicone resin used as a coating material excellent in incombustibility in a protective coat (e.g., Japanese Laid-Open Patent Publication No. 6-215910).

With regard to combustion suppression of a silicone resin, a varistor is known that is improved in flame retardancy of an exterior packaging material by adding aluminum hydroxide or magnesium hydroxide as a flame-retardant agent to a silicone resin or silicone elastomer so as to restrain ceramic contents and the exterior packaging material itself from scattering by rubber elasticity of the silicone resin or silicone elastomer (e.g., Japanese Laid-Open Patent Publication Mo. 2005-277100).

A varistor is also known that is coated by using as an exterior packaging material a silicone rubber acquired by adding a hardening agent to a liquid silicone main agent and adding aluminum hydroxide to these two agents (e.g., Japanese Laid-Open Patent Publication No. 2006-286986).

BRIEF SUMMARY OF THE INVENTION

Electronic components including varistors are required to have higher overvoltage while maintaining conventional overvoltage characteristics. For such electronic components, a silicone-based resin material is essential, while the material is expensive.

It is therefore an object of the present invention to reduce a silicone resin while maintaining incombustibility and insulation withstand voltage characteristics.

According to an aspect of the technique of this disclosure, a production method for an electronic component using an exterior packaging material containing a silicone resin comprises a step of dipping an element into an exterior packaging material containing a silicone resin to which aluminum hydroxide or magnesium hydroxide and a nonpolar solvent are added, an additive amount of the aluminum hydroxide or the magnesium hydroxide being controlled to a range of 60 [wt. %] or more to less than 70 [wt. %]; a step of drying the exterior packaging material formed on a surface of the element to evaporate the nonpolar solvent and cause a silicone resin component to appear on a surface of the exterior packaging material; and a curing step of curing the exterior packaging material.

According to an aspect of the technique of this disclosure, an electronic component uses an exterior packaging material containing a silicone resin, a nonpolar solvent and aluminum hydroxide or magnesium hydroxide is added to the silicone resin, the aluminum hydroxide or the magnesium hydroxide is added in an additive amount within a range of 60 [wt. %] or more to less than 70 [wt. %], the nonpolar solvent appears on and evaporates from a surface of the exterior packaging material by drying, and the silicone resin appears and cures on the surface of the exterior packaging material.

Figure 2:
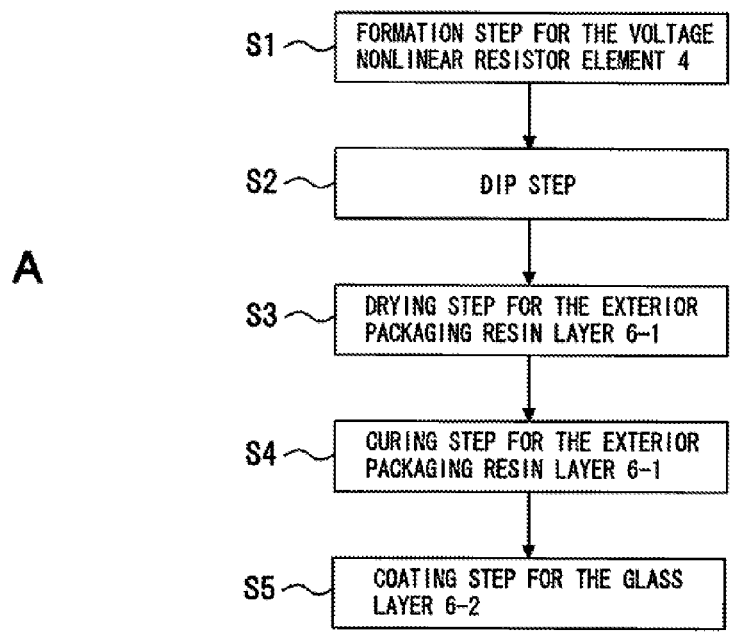
Figure 2:
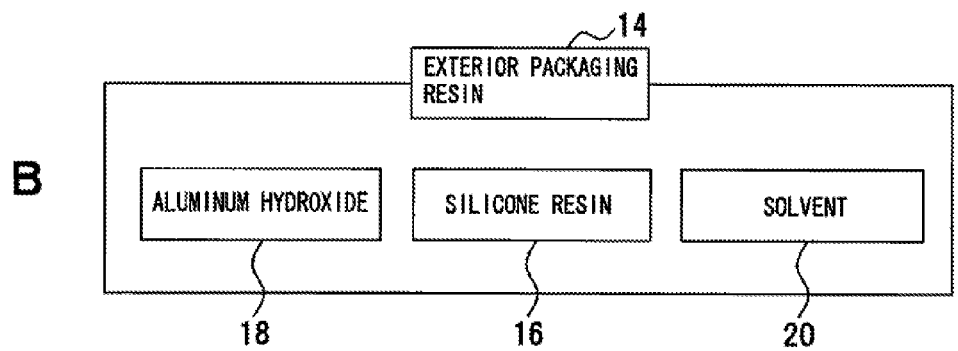

A of FIG. 2 is a diagram of process steps of a producing method for the varistor. B of FIG. 2 is a diagram of an exterior packaging resin for the varistor.

Figure 3:
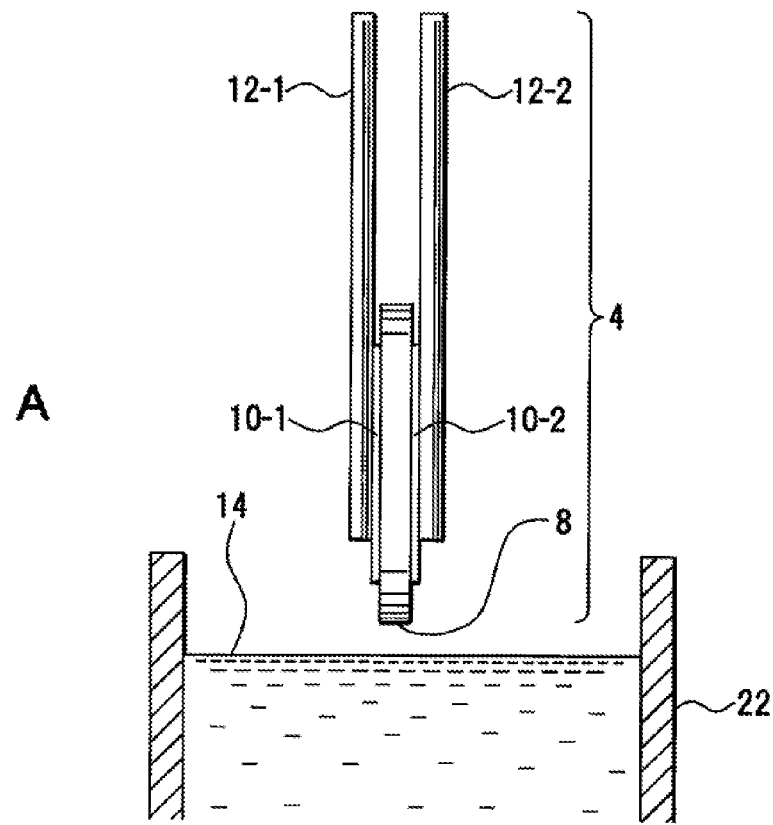
Figure 3:
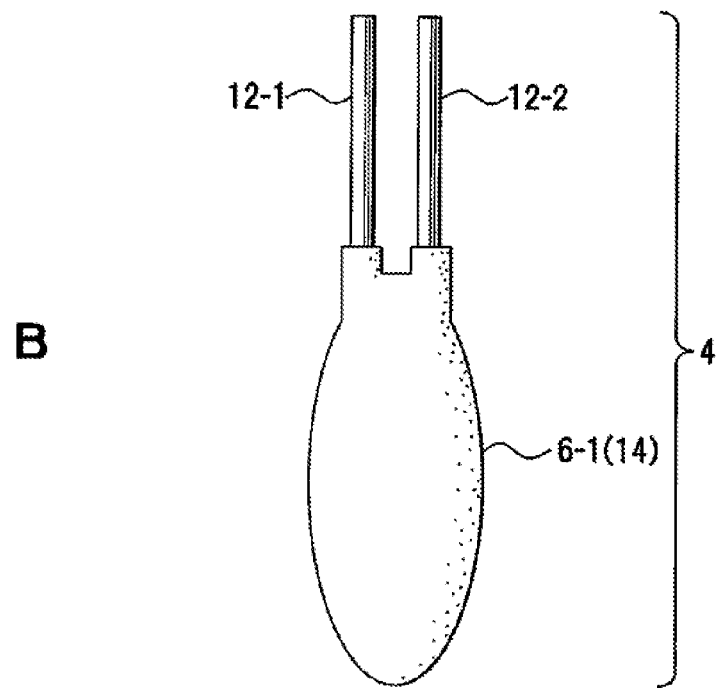

A and B of FIG. 3 is a diagram of a dip treatment of an exterior packaging resign layer.

Figure 4:
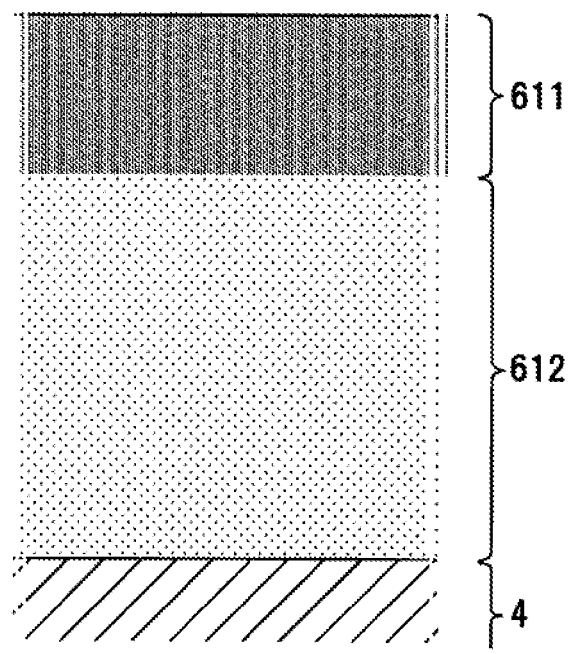
Figure 4:
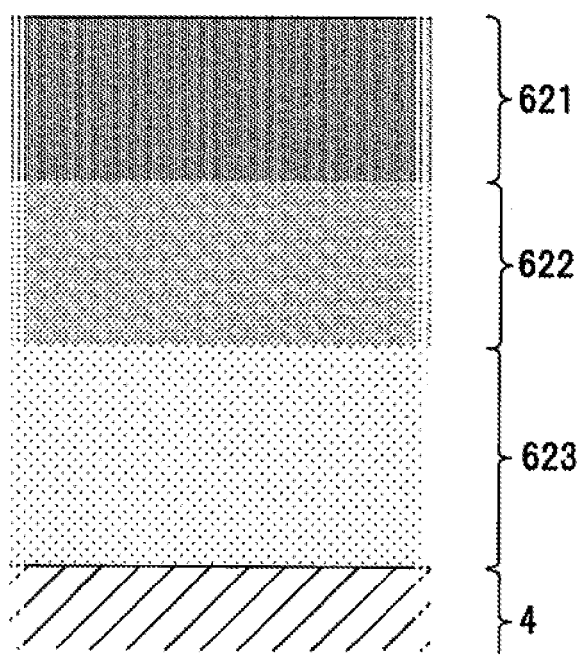

A and B of FIG. 4 is a cross-sectional view of states of the exterior packaging resign layer and a glass layer.

Figure 5:
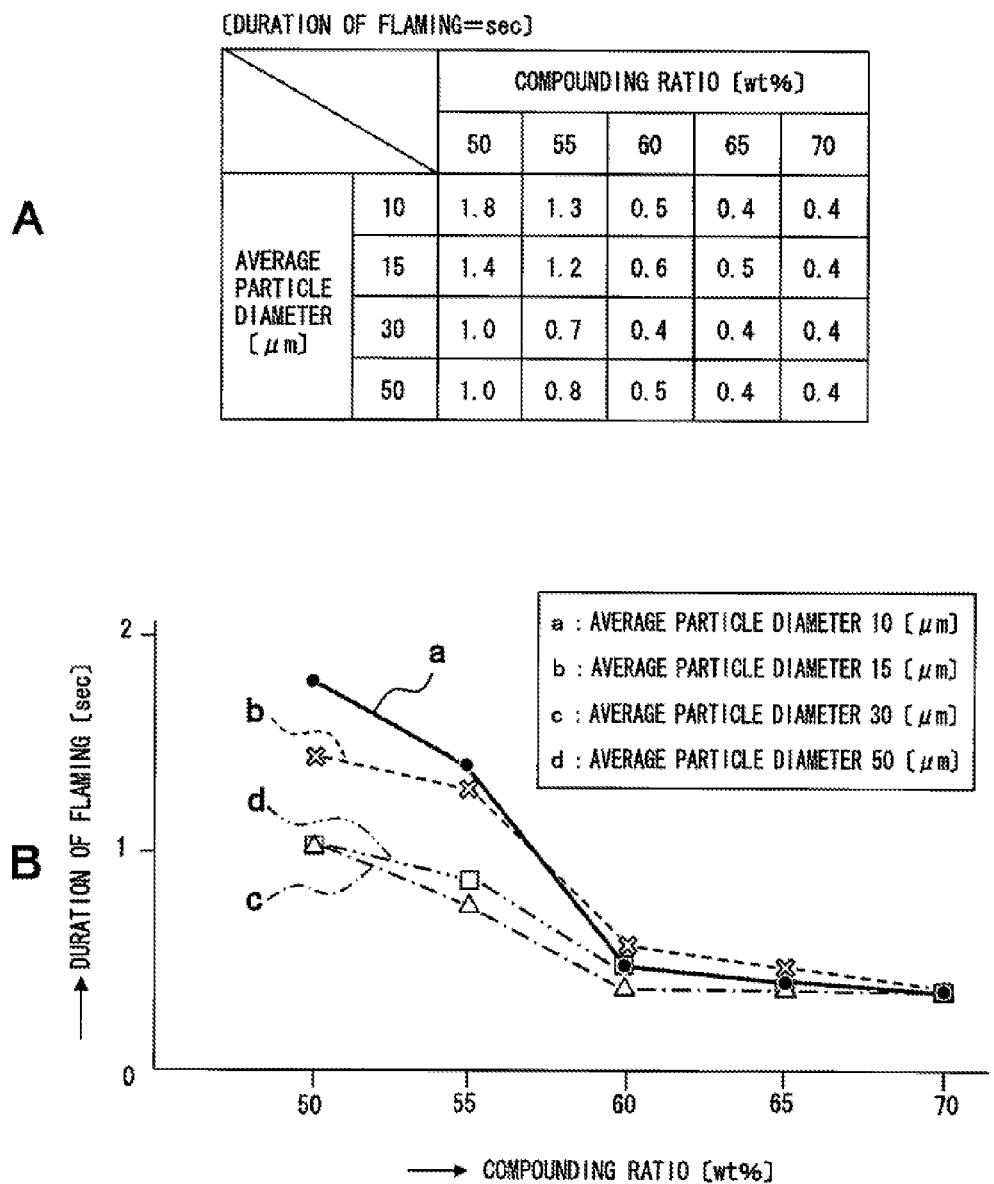

A and B of FIG. 5 is a diagram of experiment results of incombustibility.

Figure 6:
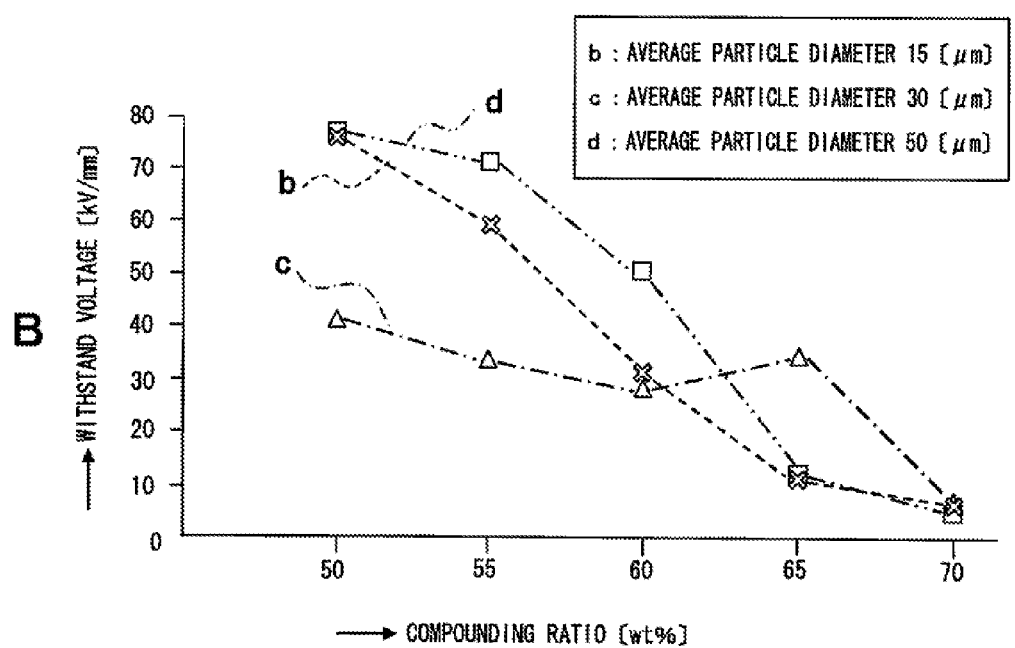

A and B of FIG. 6 is a diagram of experiment results of insulation withstand voltage.

FIG. 7 is a diagram of evaluation results of a surface state of the exterior packaging resign layer.

DETAILED DESCRIPTION OF THE INVENTION

Figure 1:
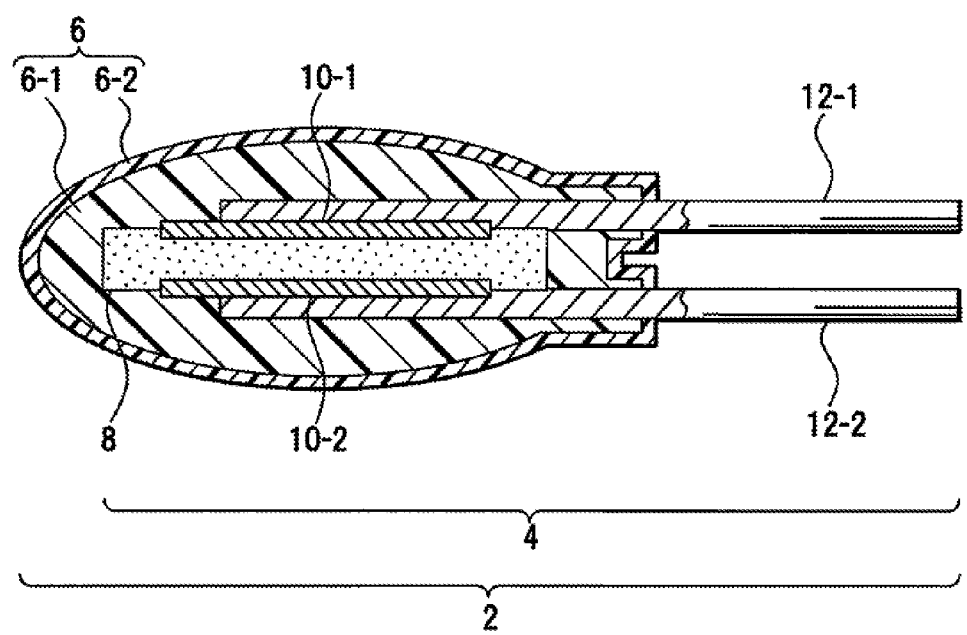
FIG. 1 is a cross-sectional view of a varistor according to a first embodiment.

FIG. 1 shows a cross section of a varistor.

This varistor 2 is a voltage nonlinear resistor and is an example of an electronic component of this disclosure.

The varistor 2 includes a voltage nonlinear resistor element (hereinafter simply referred to as the "element") 4 having a surface covered with an exterior packaging material 6. The element 4 is an example of a varistor element.

For the element 4, a ceramic element 8 is used. The ceramic element 8 is, for example, a sintered body mainly made of zinc oxide and having magnesium oxide, bismuth oxide, cobalt oxide, etc. added thereto. This sintered body is, for example, a cylinder having a diameter of about 10 [mm].

Electrodes 10-1, 10-2 are disposed on a surface of the ceramic element 8. A lead wire 12-1 is connected to the electrode 10-1 by solder and a lead wire 12-2 is connected to the electrode 10-2 by solder.

By way of example, the exterior packaging material 6 includes an exterior packaging resin layer 6-1 and a glass layer 6-2. The exterior packaging resin layer 6-1 and the glass layer 6-2 are examples of a first coating layer and a second coating layer, respectively.

A of FIG. 2 depicts an order of steps of a production method for the varistor 2.

The production method for the varistor 2 includes a formation step S1 for an element, a dip step S2, a drying step S3, a curing step S4, and a coating step S5.

At the formation step S1 for an element, the element 4 is formed. By way of example, the ceramic element 8 of the element 4 is acquired by sintering zinc oxide that is a main component with magnesium oxide, bismuth oxide, cobalt oxide, etc. added thereto. A sintered body acquired by this sintering is, for example, a cylinder having a diameter of about 10 [mm]. The electrode 10-1 and the electrode 10-2 are printed and fired on one surface side and the other surface side, respectively, of the ceramic element 8.

The lead wire 12-1 described above is connected to the electrode 10-1 by soldering and the lead wire 12-2 is connected to the electrode 10-2 by soldering.

The formation step S1 for the element 4 is followed by the dip step S2. This dip step S2 includes forming the exterior packaging resin layer 6-1 of the exterior packaging material 6 on the element 4 acquired at the formation step S1 for the element. By way of example, an exterior packaging resin 14 is used for the exterior packaging resin layer 6-1. As shown in B of FIG. 2, aluminum hydroxide 18 and a solvent 20 are added to a silicone resin 16 in the exterior packaging resin 14.

The aluminum hydroxide 18 is added within a range less than 70 [weight percent=wt. %] to the silicone resin 16 that is a main agent. The range of the additive amount is preferably 60 [wt. %] or more to 65 [wt. %] or less.

The solvent 20 may be, for example, a solvent species of nonpolar solvents compatible with the silicone resin 16. Since a solvent incompatible with the silicone resin 16 repels the silicone resin 16, a pin hole is generated during drying or an air bubble remains inside the exterior packaging resin layer 6-1, and the compatibility with the silicone resin 16 is important. The nonpolar solvent may be any of benzene, toluene, xylene, and cyclohexane, for example.

The addition of the solvent 20 can make the viscosity of the exterior packaging resin 14 lower and can increase a compounded amount of the aluminum hydroxide 18 relative to the exterior packaging resin 14, so that the formability of the exterior packaging resin 14 is improved. Moreover, since the aluminum hydroxide 18 can uniformly be dispersed, an insulation withstand voltage can be prevented from decreasing due to localization of the aluminum hydroxide 18 in the planar direction of the exterior packaging resin layer 6-1.

The exterior packaging resin layer 6-1 of the varistor 2 is a one-layer structure and, therefore, unlike a two-layer structure, a pin hole generated in the exterior packaging resin layer 6-1 cannot be covered with a second layer. Therefore, the exterior packaging resin layer 6-1 of the varistor 2 must prevent the localization of the aluminum hydroxide 18 and the pin hole while increasing a compounding ratio of the aluminum hydroxide 18 for improving the flame retardancy. Thus, the solvent 20 that is a nonpolar solvent compatible with the aluminum hydroxide 18 is added to the silicone resin 16. This configuration must make the viscosity lower without generating the pin hole in the exterior packaging resin 14 and prevent the localization of the aluminum hydroxide 18 so as to achieve both the improvement in the insulation withstand voltage and the maintenance of the formability of an outer surface. The nonpolar solvent preferably has a vapor pressure (=volatility) of 0.5 to 10 [kPa] or around 0.5 to 10 [kPa]. A higher vapor pressure leads to generation of the pin hole, resulting in an unfavorable surface state of the exterior packaging resin layer 6-1. On the other hand, a lower vapor pressure makes the time required for evaporation of the solvent 20 longer at the drying step although the surface state of the exterior packaging resin layer 6-1 is favorable.

FIG. 3 shows a dip treatment into the exterior packaging resin 14 of the ceramic element 8.

As shown in A of FIG. 3, a dip treatment tank 22 is filled with the exterior packaging resin 14 having lower viscosity. By dipping the element 4 into the exterior packaging resin 14 and pulling up the element 4 from the exterior packaging resin 14, a surface of the element 4 is covered with the exterior packaging resin 14 and the exterior packaging resin layer 6-1 described above is formed on the surface of the element 4 as shown in B of FIG. 3.

This dip treatment is followed by the drying step S3. At the drying step S3, a large portion of the solvent 20 is volatilized from the exterior packaging resin 14 forming the exterior packaging resin layer 6-1 of the element 4. At this step, the exterior packaging resin 14 is not completely cured.

This drying step S3 is preferably performed at normal temperature (20 to 30[° C.]).

The drying step S3 is followed by the curing step S4. At the curing step S4, the exterior packaging resin layer 6-1 is heat-treated and cured. The exterior packaging resin layer 6-1 is given by this curing. At the curing step S4, the solvent 20 remaining after the termination of the drying step S3 is evaporated by the heat treatment and the silicone resin component is caused to appear on the surface of the exterior packaging resin layer 6-1. In particular, by being subjected to the heat treatment, the solvent remaining in the exterior packaging resin 14 moves to the surface of the exterior packaging resin layer 6-1, appears on the surface, and evaporates. In this case, the silicone resin component appears on the surface of the exterior packaging resin layer 6-1 along with the solvent 20 moving to the surface of the exterior packaging resin layer 6-1. Subsequently, the silicone resin component having appeared on the surface of the exterior packaging resin layer 6-1 is further subjected to the heat treatment and cured, becoming glossy. The conditions of the curing step may be set as needed and may include a temperature set to 150[° C.], for example, and a curing time set to one hour, for example.

There are a first design shown in A of FIG. 4 and a second design shown in B of FIG. 4 as such a treatment. In the first design, as shown in A of FIG. 4, a first region 611 and a second region 612 are formed on the surface of the element 4. The region 611 is a thin skin layer and has, for example, a thickness of about 30[%] of the whole resin thickness. The thickness of the region 611 is an example of a depth from the surface of the exterior packaging material 6. In the region 611, within 30[%] in the depth direction from the surface of the thin skin layer, the aluminum hydroxide 18 has a concentration of about 84 to 100[%] of the resin compounding ratio, for example. In the region 612, at 30[%] or more in the depth direction from the surface of the thin skin layer, the aluminum hydroxide 18 has a concentration of about 100 to 109[%] of the resin compounding ratio, for example.

In the second design, a first region 621, a second region 622, and a third region 623 are formed. The region 621 is a thin skin layer and, within 30[%] in the depth direction from the surface of the thin skin layer, the aluminum hydroxide 18 has a concentration of about 84 to 100[%] of the resin compounding ratio, for example. In the region 622, within 50[%] in the depth direction from the surface of the thin skin layer, the aluminum hydroxide 18 has a concentration of about 90 to 100[%] of the resin compounding ratio. In the region 623, at 50[%] or more in the depth direction from the surface of the thin skin layer, the aluminum hydroxide 18 has a concentration of about 100 to 119[%] of the resin compounding ratio, for example. These concentrations represent a concentration gradient due to movement of the resin component during curing and the values are maximum estimated values relative to the resin compounding ratio. Since the aluminum hydroxide 18 is supplied from an upper layer to a lower layer, a concentration in the upper layer acquired by subtracting a portion having moved to the lower layer is defined as a concentration range. This concentration range is an average value of a corresponding region and it is considered that a portion having a concentration lower than a lower limit value may locally exist. Therefore, in this treatment, the ranges of the regions 611, 621 may be reduced by 16[%] of the average minimum values of the regions 611, 621 and the ranges of the regions 612, 622 may be increased by 9[%] of the average maximum values of the regions 612, 622.

The concentrations of the aluminum hydroxide 18 are values measured by energy dispersive X-ray spectrometry (EDX).

The curing step S4 is followed by the coating step S5. At the coating step S5, the surface of the exterior packaging resin layer 6-1 is subjected to glass coating. In this glass coating, the element 4 covered with the exterior packaging resin layer 6-1 is immersed into, for example, silica sol, to form a glass coat. This glass coat is heat-treated and cured to form the glass layer 6-2. As a result, the varistor 2 shown in FIG. 1 is acquired.

Effects of the Embodiment (1) Since the silicone resin 16 is used as a main agent and the aluminum hydroxide 18 is added at less than 70 [wt. %], more preferably 60 to 65 [wt. %], the silicone region 16 can accordingly be reduced. As a result, costs such as material costs can be reduced.

(2) The solvent 20 can be added to the exterior packaging resin 14 to restrain the viscosity from increasing due to the aluminum hydroxide 18. In particular, since the viscosity of the exterior packaging resin 14 is reduced by adding the solvent 20, a larger amount of the aluminum hydroxide 18 can be contained and the formability of the exterior packaging resin layer 6-1 can be improved by the exterior packaging resin 14.

(3) Since the viscosity of the exterior packaging resin 14 is reduced by adding the solvent 20, the localization of the aluminum hydroxide 18 can be prevented with respect to the exterior packaging resin 14. As a result, the insulation withstand voltage of the varistor 2 can be prevented from decreasing due to the localization of the aluminum hydroxide 18 in the exterior packaging resin layer 6-1. Therefore, excellent overvoltage characteristics are acquired.

(4) Since the silicone resin 16 can be caused to appear on the surface of the exterior packaging resin layer 6-1 in association with the evaporation of the solvent 20 at the curing step, the surface of the varistor 2 can be made glossy.

(5) Since the silicone resin 16 has flexibility, even if the varistor is instantaneously destroyed due to application of overvoltage exceeding a rated voltage, the exterior packaging resin layer 6-1 can be restrained from scattering.

(6) Since the surface of the exterior packaging resin layer 6-1 is in a glossy state, legibility is improved when the rating etc. of the varistor are printed by a laser on the surface of the exterior packaging resin layer 6-1.

(7) By causing the silicone resin 16 to appear on the surface of the exterior packaging resin layer 6-1, scratches can be prevented from being formed on the surface and scratch resistance is improved.

(8) Since the nonpolar solvent is used for the solvent 20, the solvent 20 is compatible with the silicone resin 16, and a pin hole can be prevented from being generated in the exterior packaging resin layer 6-1. As a result, the insulation withstand voltage of the varistor 2 can further be prevented from decreasing.

(9) Since the exterior packaging resin layer 6-1 has the concentration of the aluminum hydroxide 18 made higher as it approaches the element 4, the effect of suppressing the combustion of the element 4 is further increased.

EXPERIMENTAL RESULTS (1) Evaluation of Incombustibility

This evaluation of incombustibility relates to flaming characteristics of the varistor 2. In this evaluation experiment, when AC voltage was applied at the applied voltage ratio of 85[%] (varistor voltage V1 [mA]×0.85), duration of flaming of the exterior packaging resin layer 6-1 of the exterior packaging material 6 was measured for each compounding ratio [wt. %] by using the particle diameter [μm] of the aluminum hydroxide 18 as a parameter. A and B of FIG. 5 show measurement values and a graph thereof, respectively. B of FIG. 5 includes a, b, c, and d corresponding to average particle diameters of 10 [μm], 15 [μm], 30 [μm], and 50 [μm], respectively.

In this evaluation of incombustibility, a criterion of determination of incombustibility with respect to overvoltage breakdown is that duration of flaming less than 1 [second] indicates effective incombustibility.

According to this evaluation experiment, when the average particle diameter is 30 [μm] or more, the duration of flaming is less than 1 [second] at the compounding ratio of 55 [wt. %] or more and incombustibility is recognized.

When the average particle diameter is less than 30 [μm], the duration of flaming is less than 1 [second] at the compounding ratio of 60 [wt. %] or more and incombustibility is recognized.

Even when the average particle diameter is 10 [μm] to 50 [μm], the duration of flaming is equal to or less than 0.5 [second] at the compounding ratio of 65 [wt. %] or more and preferable incombustibility is recognized.

As described above, by adding the aluminum hydroxide 18 within a range less than 70 [wt. %] to the silicone resin 16 used as a main agent, the incombustibility is recognized as the duration of flaming less than 1.0 [second] and, when the range of the additive amount of the aluminum hydroxide 18 is from 60 [wt. %] or more to 65 [wt. %] or less, the incombustibility is more preferable. Therefore, the incombustibility of the varistor 2 can be increased while reducing the silicone resin 16.

(2) Evaluation of Insulation Withstand Voltage

In this evaluation experiment of insulation withstand voltage, the insulation breakdown at a compounding ratio [wt. %] was measured by using the particle diameter [μm] of the aluminum hydroxide 18 as a parameter. A and B of FIG. 6 show measurement values and a graph thereof, respectively. B of FIG. 6 includes b, c, and d corresponding to average particle diameters of 15 [μm], 30 [μm], and 50 [μm], respectively.

In this evaluation of insulation withstand voltage, a withstand voltage [kV/mm] of 10 [kV/mm] or more is determined as effective insulation withstand voltage.

According to this evaluation experiment, regardless of the average particle diameters of 15 [μm], 30 [μm], and 50 [μm], the effective insulation withstand voltage of 10 [kV/mm] or more is acquired at a compounding ratio of 65 [wt. %] or less.

Therefore, if the aluminum hydroxide 18 is added within a range less than 70 [wt. %] to the silicone resin 16 used as a main agent, the effective insulation withstand voltage of 10 [kV/mm] or more is acquired preferably at 60 [wt. %] to 65 [wt. %] and the over voltage characteristics of the varistor 2 can be maintained. When the compounding ratio is 60 [wt. %] to 65 [wt. %], the average particle diameter of 30 [μm] is most preferable.

(3) Evaluation of Surface State

This evaluation of a surface state was performed by visually observing a surface quality of the exterior packaging resin layer 6-1 formed on the element 4. FIG. 7 shows evaluation results thereof.

In this evaluation, a gloss of the surface of the exterior packaging resin layer 6-1 was determined and indicated by o when the surface was glossy, Δ when the gloss is reduced, and x when the gloss has disappeared.

In the evaluation of the gloss, regardless of the particle diameter, the gloss of the surface has disappeared when the compounding ratio of the aluminum hydroxide 18 is set to 70 [wt. %].

Although the gloss of the surface of the exterior packaging resin layer 6-1 does not directly affect the function of the varistor 2, the surface of the exterior packaging resin layer 6-1 is preferably glossy so as not to impair the beauty of appearance. Additionally, the rating etc. of the varistor may be printed by a laser on the surface of the exterior packaging resin layer 6-1. In this case, if the laser printing is performed on the glossy surface of the exterior packaging resin layer 6-1, legibility is improved as compared to when the surface is in an uneven state. The formation of a gloss layer reduces roughness of a surface state due to high content of the aluminum hydroxide 18 and is effective for improving the beauty of appearance and for preventing scratches due to scraping between packed products.

OTHER EMBODIMENTS (1) In the embodiment, the curing step S4 is followed by the coating step S5 for the glass coating on the surface of the exterior packaging resin layer 6-1 to form the glass layer 6-2; however, the glass layer 6-2 may not be provided.

(2) Although the exterior packaging resin 14 forming the exterior packaging resin layer 6-1 has been described as having the aluminum hydroxide 18 and the solvent 20 added to the silicone resin 16 in the embodiment, this is not a limitation. To the silicone resin 16, for example, magnesium hydroxide may be added as a flame-retardant agent along with the solvent 20.

The magnesium hydroxide is added within a range less than 70 [weight percent=wt. %] to, for example, the silicone resin 16 that is a main agent. The range of the additive amount is preferably set to 60 [wt. %] or more to 65 [wt. %] or less. The magnesium hydroxide has the density of 2.36 [g/cm$^3$] and is substantially the same as aluminum hydroxide having the density of 2.42 [g/cm$^3$]. Therefore, the additive amount of the magnesium hydroxide may be set to the conditions equivalent to those in the case of adding the aluminum hydroxide 18 described above based on the weight ratio to the silicone resin 16, for example.

The average particle diameter of the magnesium hydroxide may be set to a range of 15 [μm] or more to less than 50 [μm]. Additionally, in the process of forming the exterior packaging resin layer 6-1 of the varistor 2 in the case of adding magnesium hydroxide to the exterior packaging resin 14, the conditions of addition and the conditions of formation of the exterior packaging resin layer 6-1 may be set as in the case of adding the aluminum hydroxide 18 described in the embodiment and the process procedure may be performed in the same way.

(a) With this configuration, the exterior packaging resin 14 with the magnesium hydroxide added can have a dehydration start temperature set higher as compared to the case of adding the aluminum hydroxide 18. In particular, the exterior packaging resin 14 has the dehydration start temperature of about 200[° C.] when aluminum, hydroxide is added, and has the dehydration start temperature of about 300[° C.] when magnesium hydroxide is added. When the varistor 2 locally generates heat due to application of a surge, the exterior packaging material 6 undergoes "dehydration"→"gasification"→"swelling"→"exfoliation of resin"→"spark"→"failure mode", that is, the exterior packaging material 6 dehydrates, then gasifies, then swells, then exfoliates, then sparks, and then reaches failure mode. When the dehydration start temperature of the exterior packaging resin 14 is made higher, the varistor 2 can function under a higher heat generation temperature and can be utilized in an electronic device to which a larger surge voltage is possible applied.

(b) Since the silicone resin 16 is used as a main agent and magnesium hydroxide is added at less than 70 [wt. %], more preferably 60 to 65 [wt. %], the silicone region 16 can accordingly be reduced. As a result, costs such as material costs can be reduced.

(c) The solvent 20 can be added to the exterior packaging resin 14 to restrain the viscosity from increasing due to magnesium hydroxide. In particular, since the viscosity of the exterior packaging resin 14 is reduced by adding the solvent 20, a larger amount of magnesium hydroxide can be contained and the formability of the exterior packaging resin layer 6-1 can be improved by the exterior packaging resin 14.

(d) Since the viscosity of the exterior packaging resin 14 is reduced by adding the solvent 20, the localization of magnesium hydroxide can be prevented with respect to the exterior packaging resin 14. As a result, the insulation withstand voltage of the varistor 2 can be prevented from decreasing due to the localization of magnesium hydroxide in the exterior packaging resin layer 6-1. Therefore, excellent overvoltage characteristics are acquired.

(e) Since the silicone resin 16 can be caused to appear on the surface of the exterior packaging resin layer 6-1 in association with the evaporation of the solvent 20 at the curing step, the surface of the varistor 2 can be made glossy.

(f) Since the silicone resin 16 has flexibility, even if the varistor is instantaneously destroyed due to application of overvoltage exceeding a rated voltage, the exterior packaging resin layer 6-1 can be restrained from scattering.

(g) Since the surface of the exterior packaging resin layer 6-1 is in a glossy state, legibility is improved when the rating etc. of the varistor are printed by a laser on the surface of the exterior packaging resin layer 6-1.

(h) By causing the silicone resin 16 to appear on the surface of the exterior packaging resin layer 6-1, scratches can be prevented from being formed on the surface and scratch resistance is improved.

(i) Since the nonpolar solvent is used for the solvent 20, the solvent 20 is compatible with the silicone resin 16, and a pin hole can be prevented from being generated in the exterior packaging resin layer 6-1. As a result, the insulation withstand voltage of the varistor 2 can further be prevented from decreasing.

(j) Since the exterior packaging resin layer 6-1 has the concentration of magnesium hydroxide made higher as it approaches the element 4, the effect of suppressing the combustion of the element 4 is further increased.

Aspects of a production method for an electronic component extracted from the embodiments described above are as follows.

A production method for an electronic component using an exterior packaging material containing a silicone resin comprises a step of dipping an element into an exterior packaging material containing a silicone resin to which aluminum hydroxide or magnesium hydroxide and a nonpolar solvent are added, an additive amount of the aluminum hydroxide or the magnesium hydroxide being controlled to a range of 60 [wt. %] or more to less than 70 [wt. %]; a step of drying the exterior packaging material formed on a surface of the element to evaporate the nonpolar solvent and cause a silicone resin component to appear on a surface of the exterior packaging material; and a curing step of curing the exterior packaging material.

In the production method for an electronic component, the additive amount of the aluminum hydroxide or the magnesium hydroxide may be within a range of 60 [wt. %] or more to 65 [wt. %] or less.

In the production method for an electronic component, the aluminum hydroxide or the magnesium hydroxide may have an average particle diameter within a range of 15 [μm] or more to less than 50 [μm].

In the production method for an electronic component, the nonpolar solvent may have a vapor pressure of 0.5 to 10 [kPa].

Aspects of an electronic component extracted from the embodiments described above are as follows.

An electronic component uses an exterior packaging material containing a silicone resin, a nonpolar solvent and aluminum hydroxide or magnesium hydroxide is added to the silicone resin, the aluminum hydroxide or the magnesium hydroxide is added in an additive amount within a range of 60 [wt. %] or more to less than 70 [wt. %], the nonpolar solvent appears on and evaporates from a surface of the exterior packaging material by drying, and the silicone resin appears and cures on the surface of the exterior packaging material.

In the electronic component, the aluminum hydroxide or the magnesium hydroxide may have an average particle diameter within a range of 15 [μm] or more to less than 50 [μm].

In the electronic component, the exterior packaging material may contain the aluminum hydroxide or the magnesium hydroxide having a concentration gradient from 84 to 100 [%] in the depth direction within 30 [%] from the exterior packaging material surface.

According to the present embodiments, any of the following effects are provided.

(1) The silicone resin can be reduced while maintaining incombustibility and insulation withstand voltage characteristics of the exterior packaging material.

(2) Even if a varistor is instantaneously destroyed due to application of overvoltage exceeding a rated voltage, an exterior packaging resin can be restrained from scattering.

(3) A used amount of the silicone resin can be decreased and a manufacturing cost can be reduced.

As described above, the most preferable embodiment etc. of the present invention have been described. The present invention is not limited to the above description and can variously be modified and altered by those skilled in the art based on the spirit of the invention described in claims or disclosed in modes for carrying out the invention. These modifications and alterations obviously fall within the scope of the present invention.

The technique of this disclosure is highly useful since aluminum hydroxide or magnesium hydroxide is added to a silicone resin contained in an exterior packaging material of a varistor to maintain the incombustible property of the silicone resin in accordance with an additive amount thereof and to decrease the used amount of the silicone resin so as to reduce manufacturing costs.

The invention claimed is:

1. A production method for an electronic component using an exterior packaging material containing a silicone resin, the method comprising:

a step of dipping an element into an exterior packaging material containing a silicone resin to which aluminum hydroxide or magnesium hydroxide and a nonpolar solvent are added, an additive amount of the aluminum hydroxide or the magnesium hydroxide being controlled to a range of 60% by weight or more to less than 70% by weight;

a drying step of drying the exterior packaging material formed on a surface of the element to evaporate the nonpolar solvent and cause a silicone resin component to appear on a surface of the exterior packaging material; and a curing step of curing the exterior packaging material and the silicone resin component appearing on the surface of the exterior packaging material, wherein in the drying step and the curing step, a concentration of the aluminum hydroxide or the magnesium hydroxide to the exterior packaging material is made a gradient from the element toward the surface of the exterior packaging material in a depth direction of the exterior packaging material.

2. The production method for an electronic component according to claim 1, wherein the additive amount of the aluminum hydroxide or the magnesium hydroxide is within a range of 60% by weight or more to 65% by weight or less.

3. The production method for an electronic component according to claim 1, wherein the aluminum hydroxide or the magnesium hydroxide has an average particle diameter within a range of 15 μm or more to less than 50 μm.

4. The production method for an electronic component according to claim 1, wherein the nonpolar solvent has a vapor pressure of 0.5 to 10 kPa at room temperature.

5. The production method for an electronic component according to claim 3, wherein the nonpolar solvent has a vapor pressure of 0.5 to 10 kPa at room temperature.

6. An electronic component using an exterior packaging material containing a silicone resin, wherein a nonpolar solvent and aluminum hydroxide or magnesium hydroxide is added to the silicone resin, the aluminum hydroxide or the magnesium hydroxide is added in an additive amount within a range of 60% by weight or more to less than 70% by weight, the nonpolar solvent appears on and evaporates from a surface of the exterior packaging material by drying, and the silicone resin appears and cures on the surface of the exterior packaging material, wherein a concentration of the aluminum hydroxide or the magnesium hydroxide to the exterior packaging material is made a gradient from the element toward the surface of the exterior packaging material in a depth direction of the exterior packaging material.

7. The electronic component according to claim 6, wherein the aluminum hydroxide or the magnesium hydroxide has an average particle diameter within a range of 15 μm or more to less than 50 μm.

8. The electronic component according to claim 6, wherein the concentration of the aluminum hydroxide or the magnesium hydroxide to the exterior packaging material has a concentration gradient from 84 to 100% in the depth direction within 30% from the exterior packaging material surface.

9. The electronic component according to claim 7, wherein the concentration of the aluminum hydroxide or the magnesium hydroxide to the exterior packaging material has a concentration gradient from 84 to 100% in the depth direction within 30% from the exterior packaging material surface.

* * * * *